United States Patent
Park et al.

(10) Patent No.: US 10,156,453 B2
(45) Date of Patent: Dec. 18, 2018

(54) SYSTEM AND METHOD FOR GUIDING ROUTE OF ELECTRIC VEHICLE

(71) Applicants: HYUNDAI MOTOR COMPANY, Seoul (KR); HYUNDAI MNSOFT, INC., Seoul (KR)

(72) Inventors: Jeonghan Park, Anyang-si (KR); Chang Kiun Kwark, Seoul (KR); Jung Woo Jin, Seoul (KR)

(73) Assignees: Hyundai Motor Company, Seoul (KR); Hyundai MNSOFT, Inc., Seoul (KR)

( * ) Notice: Subject to any disclaimer, the term of this patent is extended or adjusted under 35 U.S.C. 154(b) by 50 days.

(21) Appl. No.: 15/378,346

(22) Filed: Dec. 14, 2016

(65) Prior Publication Data
US 2017/0370738 A1 Dec. 28, 2017

(30) Foreign Application Priority Data
Jun. 23, 2016 (KR) ........................ 10-2016-0078813

(51) Int. Cl.
*G01C 21/20* (2006.01)
*G01C 21/34* (2006.01)
*G01C 21/36* (2006.01)

(52) U.S. Cl.
CPC ......... *G01C 21/3469* (2013.01); *G01C 21/20* (2013.01); *G01C 21/3415* (2013.01); *G01C 21/3667* (2013.01); *G01C 21/3676* (2013.01); *G01C 21/3691* (2013.01); *G01C 21/3697* (2013.01)

(58) Field of Classification Search
None
See application file for complete search history.

(56) References Cited

U.S. PATENT DOCUMENTS 5,913,917 A * 6/1999 Murphy .............. B60R 16/0232
701/123
2007/0162222 A1 * 7/2007 Endo .................. G01C 21/3492
701/423

(Continued)

FOREIGN PATENT DOCUMENTS

JP 2002-098540 A 4/2002
JP 2011-232146 A 11/2011

(Continued)

*Primary Examiner* — Truc M Do
(74) *Attorney, Agent, or Firm* — McDermott Will & Emery LLP (57) ABSTRACT

An electric vehicle route guide system includes: a location sensor that measures a current location of an electric vehicle; a roadmap storage having link information and node information for providing a running route; a route calculator that searches for a route having a smallest total value of a compensation link cost that is generated by adding a time link cost in consideration of a running time to an energy-based link cost on each link basis from a departure point to a destination as an optimal energy route; a display that displays information for route guide of the optimal energy route; and a controller that controls operations of the location sensor, the roadmap storage, the route calculator, and the display for the search and route guide through a navigation program.

12 Claims, 8 Drawing Sheets

(56) References Cited

U.S. PATENT DOCUMENTS

| | | | | |
|---|---|---|---|---|
| 2008/0071465 A1* | 3/2008 | Chapman | G01C 21/3691 | 701/117 |
| 2010/0057339 A1* | 3/2010 | Pryakhin | G01C 21/3469 | 701/532 |
| 2010/0142448 A1* | 6/2010 | Schlicht | H04W 4/20 | 370/328 |
| 2010/0286909 A1* | 11/2010 | Tate, Jr. | G01C 21/3446 | 701/533 |
| 2011/0060517 A1* | 3/2011 | Kono | G01C 21/3469 | 701/123 |
| 2011/0224900 A1* | 9/2011 | Hiruta | G01C 21/3469 | 701/533 |
| 2012/0041804 A1* | 2/2012 | Sahinoglu | B60L 11/1816 | 705/14.1 |
| 2012/0163177 A1* | 6/2012 | Vaswani | H04L 45/00 | 370/236 |
| 2012/0179362 A1* | 7/2012 | Stille | G01C 21/3469 | 701/410 |
| 2012/0253655 A1* | 10/2012 | Yamada | B60L 11/1861 | 701/409 |
| 2013/0063283 A1* | 3/2013 | Kashima | B60L 3/12 | 340/988 |
| 2014/0156108 A1* | 6/2014 | Reich | G01C 21/3469 | 701/1 |
| 2015/0149078 A1* | 5/2015 | Profous | G01C 21/3446 | 701/426 |
| 2015/0276420 A1* | 10/2015 | McGee | G01C 21/3469 | 701/118 |
| 2015/0369619 A1* | 12/2015 | Kim | G01C 21/3469 | 701/22 |
| 2016/0061610 A1* | 3/2016 | Meyer | G01C 21/26 | 701/22 |

FOREIGN PATENT DOCUMENTS

| | | |
|---|---|---|
| KR | 10-0901013 B1 | 6/2009 |
| KR | 10-2011-0055971 A | 5/2011 |
| KR | 10-2013-0136781 A | 12/2013 |
| KR | 10-2014-0042281 A | 4/2014 |
| KR | 10-2014-0130526 A | 11/2014 |

* cited by examiner

FIG. 4 f(straight line distance between
departure point and destination)

| Straight line distance [km] | Function value |
|---|---|
| 0 | 0.00 |
| 30 | 0.33 |
| 60 | 0.93 |
| 90 | 1.60 |
| 120 | 2.47 |
| 150 | 3.20 |
| 180 | 4.00 |
| 210 | 4.67 |
| 240 | 5.20 |
| 270 | 5.67 |
| 300 | 6.00 |

FIG. 8

SYSTEM AND METHOD FOR GUIDING ROUTE OF ELECTRIC VEHICLE

CROSS-REFERENCE TO RELATED APPLICATION

This application claims the benefit of priority to Korean Patent Application No. 10-2016-0078813 filed in the Korean Intellectual Property Office on Jun. 23, 2016, the entire content of which is incorporated herein by reference.

TECHNICAL FIELD

The present disclosure relates to a system and method for guiding a route of an electric vehicle. More particularly, the present disclosure relates to a system and method for guiding a route of an electric vehicle, which guide an optimal energy route in order to solve a range anxiety problem of an electric vehicle.

BACKGROUND

In general, electric vehicles, as environmentally-friendly vehicles, require less driving costs, but have problems such as short running distances, long battery charge times, and insufficient battery charge stations, compared with general internal combustion engine vehicles.

Particularly, distance to empty (DTE) of an electric vehicle is a big concern.

Therefore, in order to increase a running distance of an electric vehicle, vehicle manufacturers have been developed a technology that provides minimum energy route guide using a navigation system.

A navigation system, which is applied to an existing internal combustion engine vehicle, can provide a shortest time route from a departure point to a destination. On the other hand, a navigation system applied to an electric vehicle provides a minimum energy route in view of a characteristic thereof. That is, the navigation system used for the electric vehicle is different from the navigation system of the conventional internal combustion engine vehicle.

The electric vehicle generally has very high efficiency, compared with the existing internal combustion engine vehicle. That is, the existing internal combustion engine vehicle has a highest efficiency driving speed of about 60-80 km/h, however, the electric vehicle has a considerably low efficiency driving speed of about 30 km/h.

Therefore, when the navigation system guides with a minimum energy route of the electric vehicle, a time difference of about one and half times to two times occurs, compared with a generally-used shortest time route. Such a time difference may be disregarded for energy saving in short distance driving, however, in long distance driving, there is a problem that a consumption time may represent several hour difference.

In more detail, one of major reasons that a user who drives the electric vehicle selects a minimum energy route instead of a general shortest time route is range anxiety.

When the user searches for a destination route, if a distance to empty (DTE) is smaller than a distance of a shortest time route, it is impossible to run to the destination, and thus, a minimum energy route having small energy consumption may be selected. In this way, when the user runs with a minimum energy route, there is a merit that a time can be reduced, compared with when the user separates from a route and charges due to charge energy shortage.

However, when a distance between a departure point and a destination is a long distance, for example, about 100 km or more, due to high efficiency in a low speed of the electric vehicle, there is a problem that a minimum energy route has a difference of 1 hour or more, compared with a shortest time route. In such long distance driving, when a user charges the electric vehicle for about 1 hour at a quick charge station while route running, the user may feel comfortable.

Therefore, a method of providing more efficient route guide in consideration of a driving distance, minimum energy, and a shortest time from a departure point to a destination of the electric vehicle is requested.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a system and method for guiding a route of an electric vehicle having advantages capable of preventing an excessively long running time from occurring by searching for an optimal energy route in consideration of a running time as well as minimum energy upon searching for a minimum energy route for long distance running of the electric vehicle having a short running distance and a long charge of battery time.

According to an exemplary embodiment of the present disclosure, an electric vehicle route guide system includes: a location sensor that measures a current location of an electric vehicle; a roadmap storage including link information and node information for providing a running route; a route calculator that searches for a route having a smallest total value of a compensation link cost that is generated by adding a time link cost in consideration of a running time to an energy-based link cost on each link basis from a departure point to a destination as an optimal energy route; a display that displays information for route guide of the optimal energy route; and a controller that controls operations of the location sensor, the roadmap storage, the route calculator, and the display for the search and route guide through a navigation program.

The link may include a link length and link speed of a start node and an end node of a corresponding segment on a road basis on a roadmap.

The route calculator may reflect a time weight function using a straight line distance from the departure point to the destination as a variable to the time link cost.

The route calculator may calculate the time link cost by multiplying a time weight function, which is a ratio that converts a running time to energy and a link running required time.

The route calculator may calculate the link running required time on each link basis by dividing a link length on each link basis that is acquired with reference to a roadmap into a link speed.

The route calculator may apply the time weight function of route search algorithm with an increased value, as the straight line distance increases.

The controller may warn through the display, when it is impossible to run a whole distance of the found optimal energy route to a destination without charge of battery.

The controller may search again for a route that can run a whole distance based on distance to empty (DTE) according to a current battery state of charge (SOC) through the route calculator, when it is impossible to run a whole distance of the optimal energy route to the destination.

According to another embodiment of the present disclosure, a method of guiding an electric vehicle route of a system that searches for an optimal energy route of an electric vehicle includes: determining, by a controller, a straight line distance from a departure point to a destination with reference to a roadmap, when a destination is input; calculating, by a rout calculator, an energy-based link cost on a link basis on a route from a departure point to a destination using route search algorithm; calculating, by the route calculator, a time link cost based on a time weight function and a link running required time using the straight line distance from a departure point to a destination as a variable; calculating, by the route calculator, a compensation link cost by adding a time link cost in consideration of a running time on a corresponding link basis to the energy-based link cost on a link basis; and searching, by the route calculator, for a smallest route of added values of the compensation link costs from the departure point to the destination to determine the smallest route to the optimal energy route.

The calculating of a time link cost may include calculating the link running required time by dividing a link length with reference to a roadmap into a link speed.

The searching for of a smallest route may include displaying the optimal energy route through a display, but recommending the optimal energy route and simultaneously displaying at least one candidate energy route on ranking basis.

The method may further include, after the searching for of a smallest route, comparing distance to empty (DTE) according to a state of charge (SOC) of the battery with the energy-based link cost of the optimal energy route and warning this, when it is impossible to run a whole distance thereof without charge of battery.

According to another embodiment of the present disclosure, an electric vehicle route guide system that guides an optimal energy route using real time traffic information includes: a location sensor that measures a current location of the electric vehicle; a roadmap storage including link information and node information for providing a running route; a route calculator that searches for a route having a smallest total value of compensation link costs that are generated by adding a time link cost in consideration of a running time on a link basis according to real time traffic information to an energy-based link cost on each link basis from a departure point to a destination as an optimal energy route; a display that displays information for route guide of the optimal energy route; and a controller that controls operations of the location sensor, the roadmap storage, the route calculator, and the display for the search and route guide through a navigation program.

The route calculator may calculate a time link cost based on a time weight function using a straight line distance from the departure point to the destination as a variable and a link running required time in which a time that is taken when an actual vehicle passes through on each link basis is reflected.

According to the exemplary embodiments of the present disclosure as described above, by searching for an optimal route in consideration of a running time as well as minimum energy to correspond to a characteristic of an electric vehicle having a relatively short running distance and long battery charge time instead of an existing lowest energy route, an excessively long running time can be prevented from occurring.

Further, by differentially searching for a route based on energy and a route based on a time of an electric vehicle according to a running distance using a straight line distance between a departure point and a destination, efficient route guide in which existing minimum energy route algorithm and shortest time route algorithm is compensated can be provided.

By determining and previously warning whether a whole distance of a route that is found by route search algorithm can be run without charge of a battery, a route corresponding to a charge tendency of a user can be guided.

DETAILED DESCRIPTION OF THE EMBODIMENTS

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In an entire specification, unless explicitly described to the contrary, the word "comprise" and variations such as "comprises" or "comprising" will be understood to imply the inclusion of stated elements but not the exclusion of any other elements, In addition, the terms "-er", "-or", and "module" described in the specification mean units for processing at least one function and operation and can be implemented by hardware components or software components and combinations thereof.

In an entire specification, several methods may be executed by at least one controller. A term "controller" indicates a hardware device including a memory and a processor that executes at least one step that is analyzed with an algorithm structure. The memory stores algorithm steps, and the processor specially executes the algorithm steps in order to perform at least one processor that is described in the following description.

Hereinafter, a system and method for guiding an electric vehicle route according to an exemplary embodiment of the present disclosure will be described in detail with reference to the drawings.

In general, optimal route algorithm for running an electric vehicle searches for a route for minimizing a cost of any one of a running time and energy.

For example, shortest time route algorithm searches for a route that reduces a running time to the maximum, and minimum energy route algorithm searches for a route for minimizing energy consumption.

Therefore, minimum energy route algorithm having a problem in the foregoing long distance route search requires a process of converting a running time to energy in order to guide to a route requiring a smaller time than that of a minimum energy route.

However, when simply converting and using a running time to energy, the following problem should be considered.

First, when an energy conversion ratio of a running time is determined to small, a running estimated time may be consumed for 1 hour or more, compared with a shortest time route when searching for a long route similar to an existing case.

In contrast, when an energy conversion ratio of a time is highly determined, upon searching for a short route, there is no difference between a shortest time route and a minimum energy route, and thus, there is a problem that a minimum energy route loses a function as a minimum energy route.

Resultantly, the problem can be solved with a method of differently applying an energy conversion ratio of a time according to a route length (distance) between a departure point and a destination.

However, a still remaining problem is that a route between a departure point and a destination may not be known until calculating the route, and because such a method may not be theoretically applied, a route guide system in which an energy conversion ratio is introduced according to a new running time according to an exemplary embodiment of the present disclosure is suggested.

Figure 1:
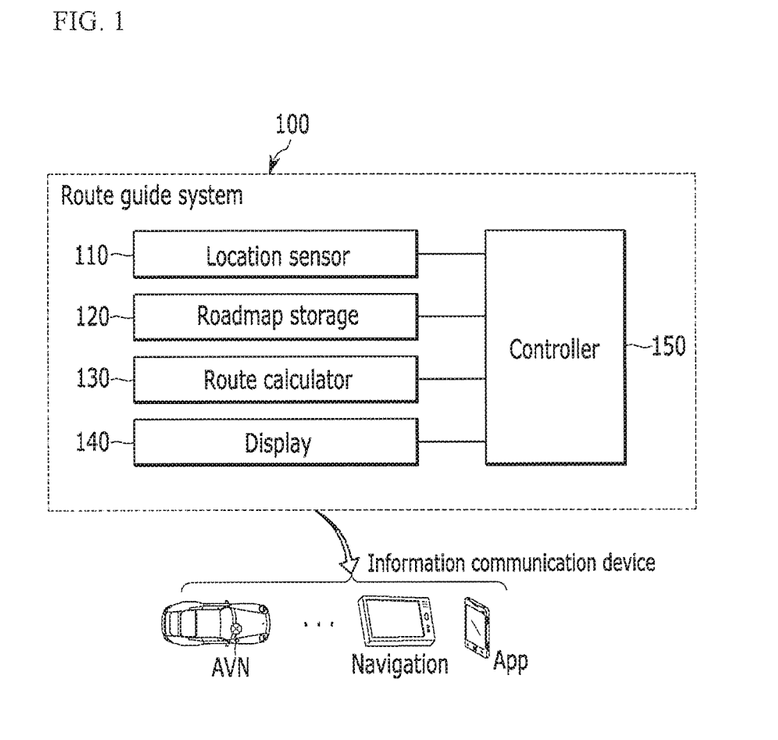
FIG. 1 is a block diagram illustrating a configuration of an electric vehicle route guide system according to an exemplary embodiment of the present disclosure.

FIG. 1 is a block diagram illustrating a configuration of an electric vehicle route guide system according to an exemplary embodiment of the present disclosure.

Referring to FIG. 1, an electric vehicle route guide system 100 according to an exemplary embodiment of the present disclosure includes a location sensor 110, a roadmap storage 120, a route calculator 130, a display 140, and a controller 150.

The route guide system 100 may be basically an audio video and navigation (AVN) that is mounted in an electric vehicle or may be applied to provide a route guide function thereof.

However, the present disclosure is not limited thereto and may be applied to an information communication device such as a navigation device that provides route guide and a portable terminal in which an application program App that can implement a navigation function is stored.

The location sensor 110 measures a current location and speed of the vehicle through a global positioning system (GPS).

The roadmap storage 120 provides a road map for providing a running route from a current departure point to a destination and includes link and node information for providing route search algorithm.

Figure 2:
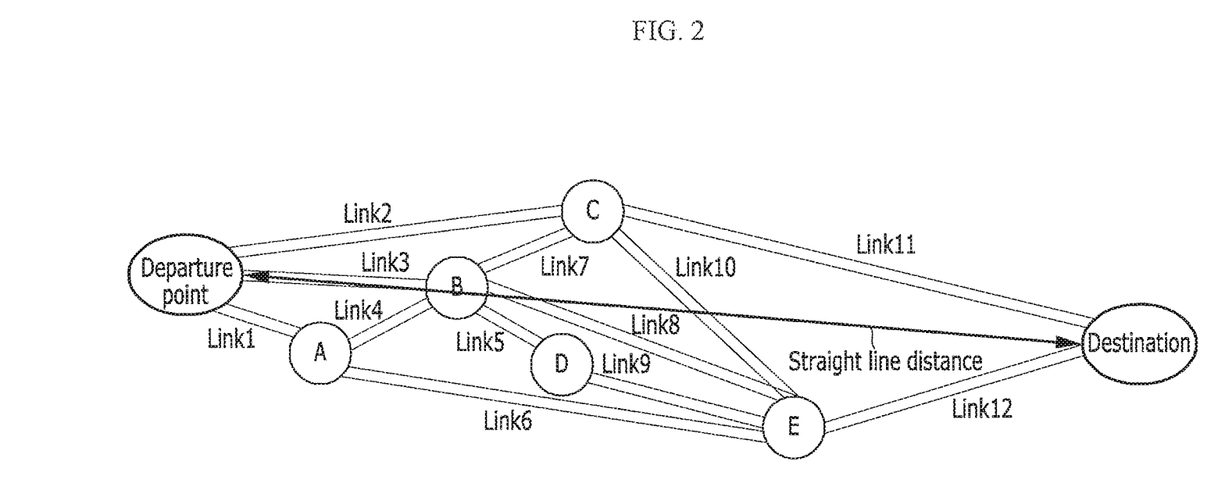
FIG. 2 is a diagram illustrating a concept and a straight line distance of a link-node on route search algorithm according to an exemplary embodiment of the present disclosure.

FIG. 2 is a diagram illustrating a concept and a straight line distance of a link-node on route search algorithm according to an exemplary embodiment of the present disclosure.

Referring to FIG. 2, the link is a kind of identity information ID that is set to distinguish a connection segment of a node and a node on each road basis on a roadmap for route search of the vehicle.

The node is a contact point in which a link and a link meet and may be a kind of branch point. That is, the node may mean a network element corresponding to an intersection portion in an actual road.

The link includes a link length (Link# Length) and a link speed (Link# Speed) of a start node and an end node that connect a corresponding segment according to an advancing direction on a road basis, In FIG. 2, for convenience, a distance between a node and a node is represented with a link, but it is not limited thereto, and when a distance between nodes is long, the distance may be divided into a plurality of links. For example, a Link 6 between a node A and a node E may include a link that is subdivided into Link6#1 to Link6#n−1. In this case, the subdivided link may include each link length and link running time.

The route calculator 130 searches for and guides an optimal energy route of an electric vehicle using a straight line distance from a departure point and to the destination and a time weight value with reference to the roadmap according to a driver's destination input.

The route calculator 130 searches for a smallest route of a total value of compensation link cost (C_Link Cost) that are generated by adding a time link cost (Link# Time Cost) in consideration of a running time to an energy-based link cost (E_Link Cost) on each link basis from a departure point to a destination as an optimal energy route.

Hereinafter, a method in which the route calculator 130 according to an exemplary embodiment of the present disclosure searches for an optimal energy route of the electric vehicle will be described in more detail through the following description.

First, the route calculator 130 defines an energy-based link cost (E_Link Cost) on each link basis using route search algorithm and calculates an energy-based link cost (E_Link Cost) on a route.

In this case, the energy-based link cost (E_Link Cost) may be calculated by Equation 1.

$$E\_link\# \ Cost = Link\# \ \text{Drive Energy} + Link\# \ \text{HV AC Energy} + Link\# \ \text{Lighting Energy} + \quad \text{(Equation 1)}$$

Here, the Link# Drive Energy means necessary driving energy upon running a corresponding link, Link# HV AC Energy means air conditioning energy that is consumed upon running a corresponding link, and Link# Lighting Energy means lighting energy that is consumed upon running a corresponding link.

Thereby, the route calculator 130 may calculate the energy-based link cost (E_Link Cost) with necessary entire energy when an electric vehicle runs a corresponding link.

In this case, factors necessary for calculating the energy-based link cost may be different according to an electric vehicle kind, Therefore, the route calculator 130 may calculate based on an energy consumption amount on a previously defined element basis on a link basis through learning on an application vehicle model basis.

Thereafter, the route calculator 130 calculates a compensation link cost (C_Link Cost) that is compensated by adding a time link cost (Link# Time Cost) in consideration of a running time on a corresponding link basis to an energy-based link cost (E_Link Cost) on each link basis on a destination route.

In this case, the compensation link cost (C_Link Cost) may be calculated by Equation 2.

$$C\_Link\# \; Cost = E\_Link\# \; Cost + Link\# \; Time \; Cost \quad \text{(Equation 2)}$$

Here, the Link# Time Cost is calculated based on a time weight function f using a straight line distance from a departure point to a destination as a variable and a link running required time (Link# Time). The straight line distance may be acquired as a distance from a departure point (departure coordinate) to a destination (destination coordinate) on a roadmap, as shown in FIG. 2.

The time link cost (Link# Time Cost) may be calculated by Equation 3.

$$Link\# \; Time \; Cost = Link\# \; Time \times f \; \text{(straight line distance between departure point and destination)}$$

$$Link\# \; Time = Link\# \; Length \div Link\# \; Speed \quad \text{(Equation 3)}$$

The route calculator 130 calculates the time link cost (Link# Time Cost) by multiplying the time weight function f and a link running required time (Link# Time).

Further, the route calculator 130 divides a corresponding link length (Link# Length) that is acquired with reference to a roadmap into a link speed (Link# Speed) to calculate the link running required time (Link# Time).

The route calculator 130 searches for a smallest route of an added value of the compensation link cost (C_Link Cost) from a departure point to a destination to determine the found smallest route to an optimal energy route.

That is, the route calculator 130 may search for a route in which a total value of compensation link cost (C_Link Cost) is a minimum among various link combination routes from a departure point to a destination.

In such an exemplary embodiment of the present disclosure, because a straight line distance from a departure point to a destination may be known before route search using a user current location and an input destination coordinate regardless of a route, there is a merit that the straight line distance may be available as an input variable of route search algorithm.

That is, a conventional problem that a route may not be used as an input variable with algorithm for route search can be solved by using a straight line distance between a departure point and a destination as an input variable in an exemplary embodiment of the present disclosure.

A time weight function f, which is a major variable necessary for calculating a time link cost (Link# Time Cost) according to an exemplary embodiment of the present disclosure means a ratio that converts a running time or importance of a running time of a user to energy.

Such a time weight function f will be described in detail with reference to FIGS. 3 to 6.

Figure 3:
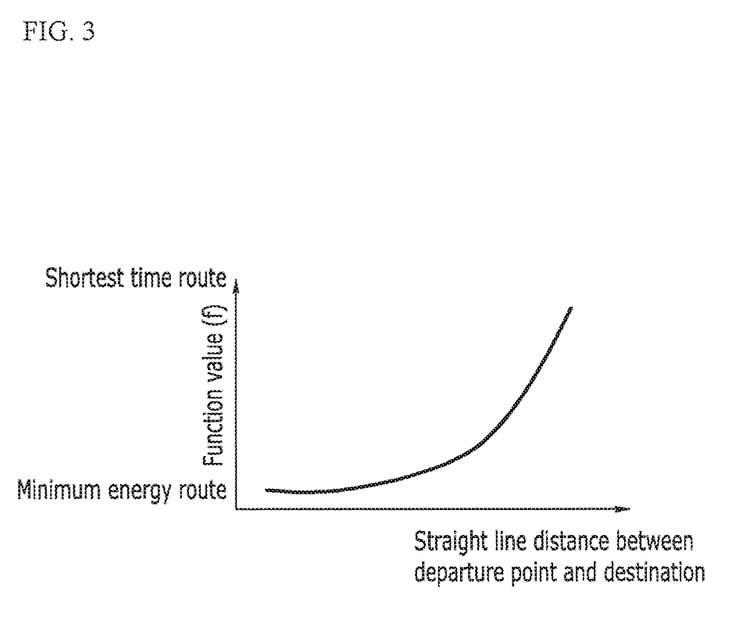
FIG. 3 is a graph illustrating a basic concept of a time weight function according to an exemplary embodiment of the present disclosure.

FIG. 3 is a graph illustrating a basic concept of a time weight function according to an exemplary embodiment of the present disclosure.

Referring to FIG. 3, when searching for a minimum energy route to a long distance of an electric vehicle, which is an object according to an exemplary embodiment of the present disclosure, in order to prevent an excessively long running time from occurring, a time weight function f has an inevitably increase function.

Route search algorithm according to the time weight function f value searches for a route between a minimum energy route and a shortest time route. For example, when a time weight function f value is 0, the time weight function f value is the same as a route result of mini m energy route algorithm, and as a time weight function f value increases, the time weight function f value approaches a route search result of shortest time route algorithm.

Figure 4:
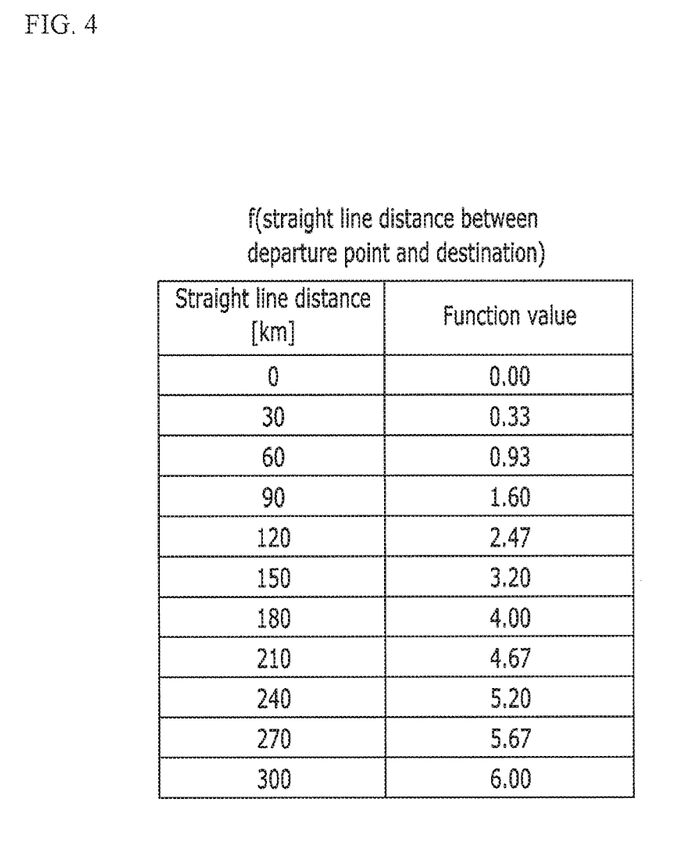
FIG. 4 illustrates a time weight function table on a straight line distance basis of a search route according to an exemplary embodiment of the present disclosure.

FIG. 4 illustrates a time weight function table on a straight line distance basis of a search route according to an exemplary embodiment of the present disclosure.

Referring to FIG. 4, in order to calculate the time link cost (Link# Time Cost), the route calculator 130 may set and use a time weight function table on a straight line distance basis.

In the time weight function table on a straight line distance basis, as a straight line distance from a departure point to a destination increases, a time weight function f value that is multiplied to a Link# Time also increases. However, the time weight function table is not limited to a numerical value of FIG. 4 and may be subdivided with more various methods.

The time weight function f may be tuned in an appropriate shape according to a vehicle kind or a road characteristic to select a route of a desired concept.

Figure 5:
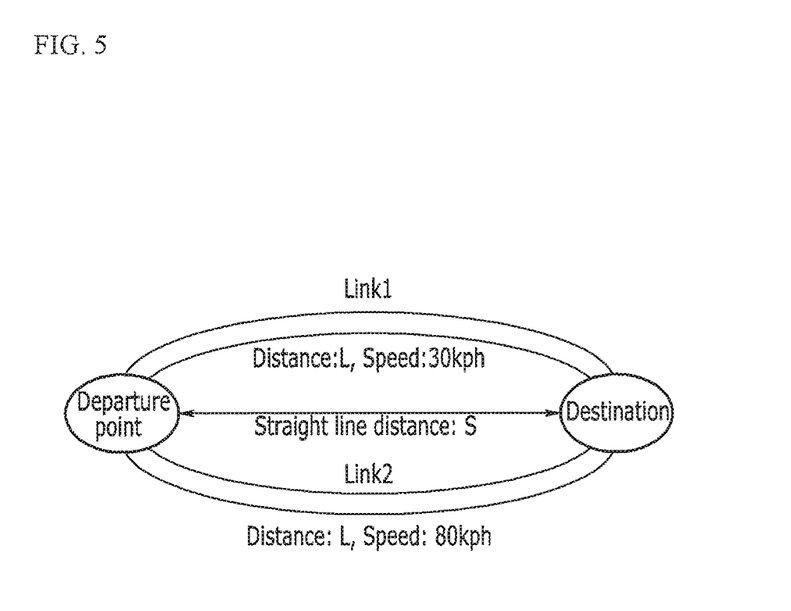
FIG. 5 is a diagram illustrating a simplified route that is formed with two links according to an exemplary embodiment of the present disclosure.

For example, FIG. 5 illustrates a simplified route that is formed with two links according to an exemplary embodiment of the present disclosure.

Referring to FIG. 5, it is assumed that there is a route that is formed with two links having the same distance L and different average speeds from a departure point to a destination.

The route calculator 130 may select a Link1 or a Link2 with route search algorithm according to a straight line distance S.

In this case, in a short distance in which the straight line distance S is short, because a value of a time weight function f is small, the route calculator 130 may select the Link1, but may select the Link 2 in a long distance.

Figure 6:
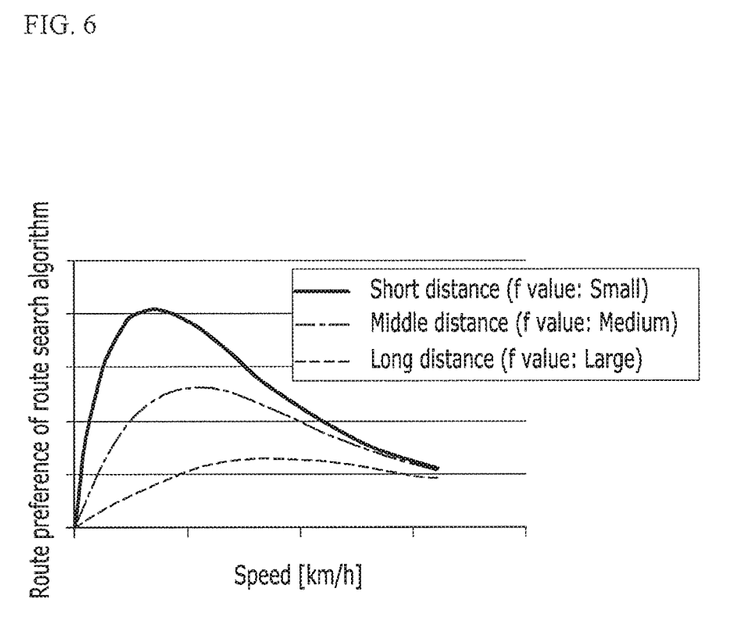
FIG. 6 is a graph illustrating route preference of route search algorithm of a case in which a time weight function is applied according to an exemplary embodiment of the present disclosure.

FIG. 6 is a graph illustrating route preference of route search algorithm of a case in which a time weight function is applied according to an exemplary embodiment of the present disclosure.

Referring to FIG. 6, by differently applying an energy conversion ratio of a time according to a straight line distance S from a departure point to a destination, the route calculator 130 may differentiate route preference of route search algorithm according to a straight line distance.

The route calculator 130 may differentiate by applying a time weight function f of route search algorithm to a small value when a straight line distance is a short distance and by applying a time weight function f of route search algorithm to a large value when a straight line distance is a long distance.

Further, the route calculator 130 may apply a time weight function f to a medium value in route search algorithm in which the straight line distance is a medium distance between the short distance and the long distance.

The display 140 displays an input interface for route guide manipulation and screen information for route guide according to execution thereof.

The display 140 may be implemented with various methods such as a touch screen, a head-up display, and a projector.

The controller 150 controls general operations of the each unit for driving of the electric vehicle route guide system 100.

The controller 150 may be configured with a superordinate controller that integration controls various controllers such as a battery controller, a motor controller, an air conditioning controller, a lamp controller, and an AVN necessary for operation of an electric vehicle.

Therefore, the controller 150 may control execution and substantial operation of the route calculator 130 through route search algorithm and a navigation program according to an exemplary embodiment of the present disclosure.

By changing a time weight function on a straight line distance basis that is set to a default according to a user input, the controller 150 may perform a route search based on energy or a differentiate route search based on a running time according to a user tendency.

For example, the controller 150 may perform route search algorithm that increases a weight value to a running time by upward adjusting a general time weight function to a straight line distance or that increases a weight value of energy by downward adjusting a time weight function according to a user input.

The controller 150 may compare distance to empty (DTE) according to a state of charge (SOC) of the battery that is acquired from the battery controller with an energy-based link cost (E_Link Cost) that is calculated by the route calculator 130 to determine whether a whole distance can be run to a destination without charge of a battery.

In an exemplary embodiment of the present disclosure, the controller 150 may be a general electronic control unit (ECU).

Figure 7:
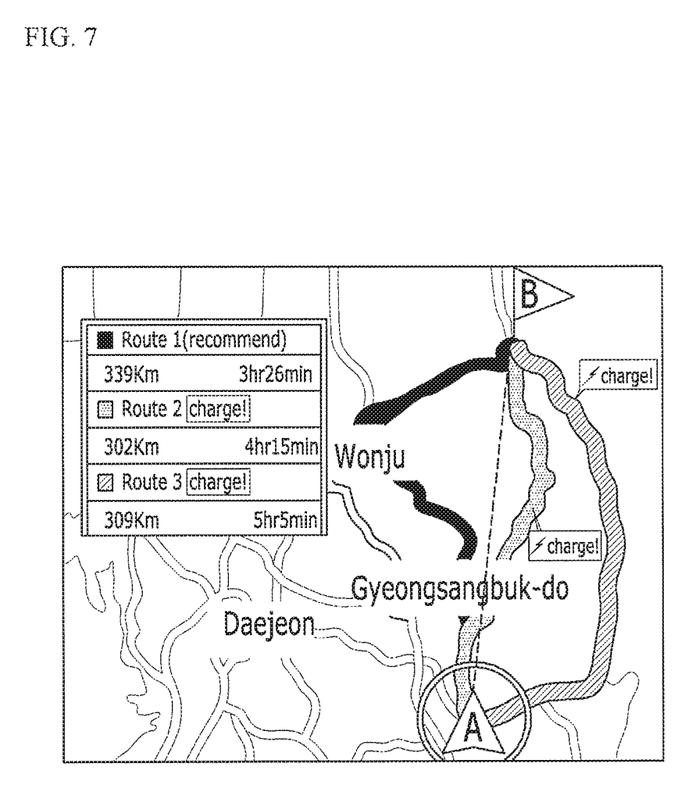
FIG. 7 illustrates a screen that determines and displays a route that can run a whole distance among candidate routes of a long distance search according to an exemplary embodiment of the present disclosure.

For example, FIG. 7 illustrates a screen that determines and displays a route in which a whole distance can be run among candidate routes of long distance search according to an exemplary embodiment of the present disclosure.

FIG. 7 illustrates a screen representing whether a whole distance can be run to the destination by comparing the DTE and the energy-based link cost of each of three routes that are found from a departure point A to a destination B according to route search algorithm according to an exemplary embodiment of the present disclosure.

Here, in a recommended route 1, a running distance is longest, but a whole distance of the route can be run without charge of a battery to a destination, however, a running distance of a route 2 and a route 3 is smaller than that of the route 1, but requires charge of a battery. That is, a running distance of the route 2 and the route 3 is smaller than that of the route 1, but a battery charge time is added and thus an estimated arrival time becomes larger than that of the route 1.

When it is impossible to run a whole distance of an optimal energy route which is found in the route calculator 130 to a destination without charging a battery (i.e., the route 2 and the route 3 of FIG. 7), the controller 150 may warn this situation through the display 140. Further, the controller 150 may search again for the second best energy route that can run a whole distance based on DTE according to a current SOC through the route calculator 130.

A method of guiding an electric vehicle route based on a configuration of the electric vehicle route guide system 100 according to the foregoing exemplary embodiment of the present disclosure will be described with reference to FIG. 8.

A configuration of each unit that is described with reference to FIG. 1 may be combined with the electric vehicle route guide system 100, and therefore, it is assumed that a subject when describing a method of guiding an electric vehicle route is the route guide system 100.

Figure 8:
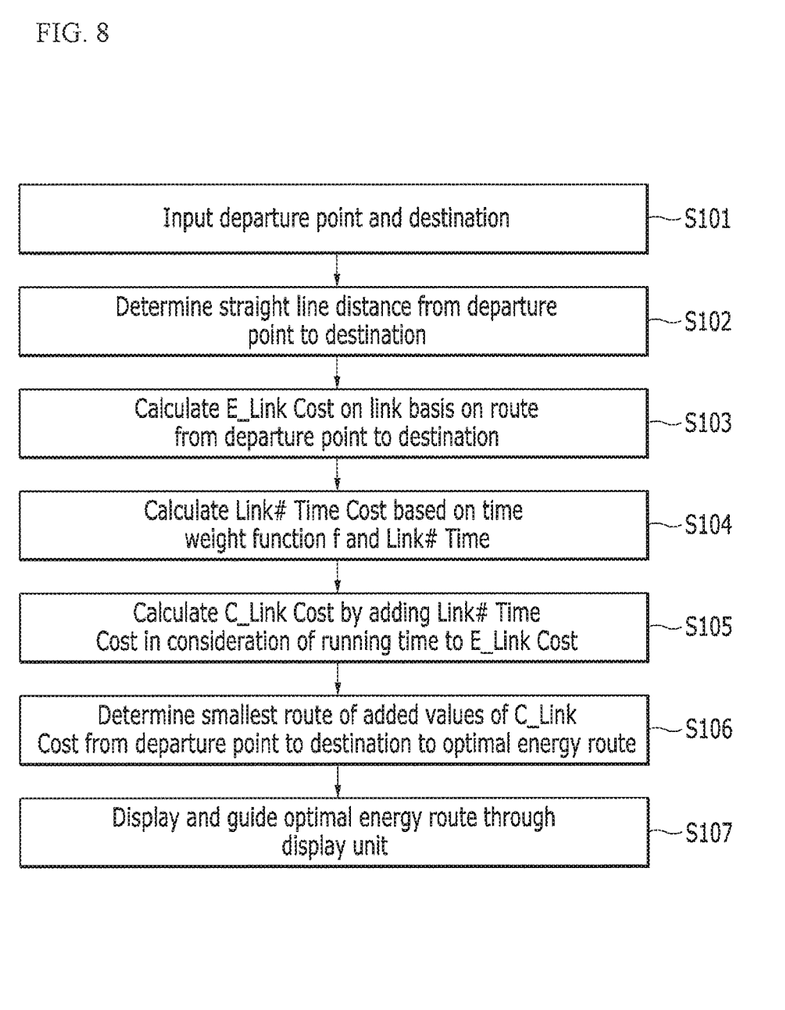
FIG. 8 is a flowchart illustrating a method of guiding an electric vehicle route according to an exemplary embodiment of the present disclosure.

FIG. 8 is a flowchart illustrating a method of guiding an electric vehicle route according to an exemplary embodiment of the present disclosure.

Referring to FIG. 8, in the electric vehicle route guide system 100 according to an exemplary embodiment of the present disclosure, when a destination is input (S101), the electric vehicle route guide system 100 determines a straight line distance from a departure point to the destination with reference to a roadmap (S102). The departure point is determined to a vehicle current location of the location sensor 110.

The route guide system 100 calculates an energy-based link cost (E_Link Cost) on a link basis on a route from the departure point to the destination using route search algorithm (S103).

The route guide system 100 calculates a time link cost (Link# Time Cost) based on a time weight function f using a straight line distance from the departure point to the destination as a variable and a link running required time (Link# Time) (S104). In this case, the time link cost (Link# Time) may be calculated by dividing a link length (Link# Length) with reference to a roadmap into a link speed (Link# Speed).

The route guide system 100 calculates a compensation link cost (C_Link Cost) by adding the time link cost (Link# Time Cost) in consideration of a running time on a corresponding link basis to the energy-based link cost (E_Link Cost) on a link basis (S105).

The route guide system 100 searches for a smallest route of added values of the compensation link cost (C_Link Cost) from the departure point to the destination and determines the found smallest route to an optimal energy route (S106).

The route guide system 100 displays the optimal energy route through the display 140 and starts route guide according to guide setting (S107). In this case, the route guide system 100 may recommend the optimal energy route and simultaneously display at least one candidate energy route on ranking basis.

The various embodiments disclosed herein, including embodiments of the route guide system 100 and/or elements thereof, can be implemented using one or more processors coupled to a memory (or other non-transitory machine readable recording medium) storing computer-executable instructions for causing the processor(s) to perform the functions described above including the functions described in relation to the roadmap storage 120 and the route calculator 130.

Further, when it is impossible to run a whole distance thereof without charging a battery, the route guide system 100 may compare DTE according to a SOC of the battery with the energy-based link cost (E_Link Cost) of the optimal energy route and warn this.

Further, if it is impossible to run a whole distance thereof, the route guide system 100 may search again for an energy route that can run a whole distance based on DTE.

In this way, according to the exemplary embodiment of the present disclosure, by searching for an optimal route in consideration of a running time as well as minimum energy to correspond to a characteristic of an electric vehicle having a relatively short running distance and long battery charge time instead of an existing lowest energy route, an excessively long running time can be prevented from occurring.

Further, by differentially searching for a route based on energy and a route based on a time of an electric vehicle according to a running distance using a straight line distance between a departure point and a destination, efficient route guide in which existing minimum energy route algorithm and shortest time route algorithm is compensated can be provided.

Further, by determining and previously warning whether a whole distance of a route that is found by route search algorithm can be run without charge of a battery, a route corresponding to a user's charge tendency can be guided.

In the foregoing description, an exemplary embodiment of the present disclosure has been described, but the present disclosure is not limited to the exemplary embodiment and may be variously changed.

For example, by dividing a corresponding Link# Length that is acquired with reference to a roadmap into a Link# Speed, the route guide system 100 according to the foregoing exemplary embodiment of the present disclosure calculates the Link# Time.

However, the present disclosure is not limited thereto, and the route guide system 100 further includes telematics or a wireless communication module, thereby receiving real time traffic information from a traffic control server of the outside and applying the real time traffic information to optimal energy route determination.

Specifically, by applying the Link# Speed to a time that is taken when an actual vehicle passes through on each link basis that is collected from the outside instead of an average speed, the route guide system 100 may calculate a link running required time in which real time traffic information is reflected.

Further, the route guide system 100 may calculate a time link cost based on a time weight function and a link running required time to which a time that is taken when an actual vehicle passes through on the each link basis is reflected. The route guide system 100 may calculate a compensation link cost to which real time traffic information is reflected by adding the time link cost to an energy-based link cost.

Therefore, the route guide system 100 may determine a smallest route of added values of compensation link costs to which real time traffic information is reflected to an optimal energy route.

Thereby, there is a merit that a route guide system according to an exemplary embodiment of the present disclosure can search for an optimal route in consideration of a running time according to real time traffic information as well as minimum energy.

An exemplary embodiment of the present disclosure may not only be embodied through the above-described apparatus and/or method but may also be embodied through a program that executes a function corresponding to a configuration of the exemplary embodiment of the present disclosure or through a recording medium on which the program is recorded and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electric vehicle route guide system, comprising:
   a location sensor that measures a current location of an electric vehicle;
   a roadmap storage having link information and node information for providing a running route;
   a route calculator that searches for a route having a smallest total value of a compensation link cost that is generated by adding a time link cost in consideration of a running time to an energy-based link cost on each link basis from a departure point to a destination as an optimal energy route;
   a display that displays information for route guide of the optimal energy route; and
   a controller that controls operations of the location sensor, the roadmap storage, the route calculator, and the display for the search and route guide through a navigation program,
   wherein the route calculator reflects a time weight function using a straight line distance from the departure point to the destination as a variable to the time link cost.

2. The electric vehicle route guide system of claim 1, wherein the link information includes a link length and a link speed of a start node and an end node of a corresponding segment on a road basis on a roadmap.

3. The electric vehicle route guide system of claim 1, wherein the route calculator calculates the time link cost by multiplying the time weight function, which is a ratio that converts a running time to energy and a link running required time.

4. The electric vehicle route guide system of claim 3, wherein the route calculator calculates the link running required time on each link basis by dividing a link length on each link basis that is acquired with reference to a roadmap into a link speed.

5. The electric vehicle route guide system of claim 1, wherein the route calculator applies the time weight function of route search algorithm with an increased value, as the straight line distance increases.

6. The electric vehicle route guide system of claim 1, wherein the controller warns through the display, when it is impossible to run a whole distance of the found optimal energy route to the destination without charging of a battery.

7. The electric vehicle route guide system of claim 6, wherein the controller searches again for a route that can run the whole distance based on distance to empty (DTE) according to a current battery state of charge (SOC) through the route calculator, when it is impossible to run a whole distance of the optimal energy route to the destination.

8. A method of guiding an electric vehicle route of a system that searches for an optimal energy route of an electric vehicle, the method comprising steps of:
   determining, by a controller, a straight line distance from a departure point to a destination with reference to a roadmap, when a destination is input;
   calculating, by a route calculator, an energy-based link cost on a link basis on a route from a departure point to a destination using route search algorithm;
   calculating, by the route calculator, a time link cost based on a time weight function and a link running required time using the straight line distance from a departure point to a destination as a variable;
   calculating, by the route calculator, a compensation link cost by adding the time link cost in consideration of a running time on a corresponding link basis to the energy-based link cost on a link basis; and
   searching, by the route calculator, for a smallest route of added values of the compensation link costs from the departure point to the destination to determine the smallest route to the optimal energy route.

9. The method of claim 8, wherein the step of calculating the time link cost comprises calculating the link running required time by dividing a link length with reference to a roadmap into a link speed.

10. The method of claim 8, wherein the step of searching for the smallest route comprises: displaying the optimal energy route through a display; and recommending the optimal energy route, and simultaneously, displaying at least one candidate energy route on ranking basis.

11. The method of claim 8, further comprising, after the step of searching for the smallest route: comparing distance to empty (DTE) according to a state of charge (SOC) of a battery with the energy-based link cost of the optimal energy route and warning a comparison result, when it is impossible to run a whole distance thereof without charging of the battery.

12. An electric vehicle route guide system that guides an optimal energy route using real time traffic information, the electric vehicle route guide system comprising:
   a location sensor that measures a current location of the electric vehicle;
   a roadmap storage having link information and node information for providing a running route;
   a route calculator that searches for a route having a smallest total value of compensation link costs that are generated by adding a time link cost in consideration of a running time on a link basis according to real time traffic information to an energy-based link cost on each link basis from a departure point to a destination as an optimal energy route;
   a display that displays information for route guide of the optimal energy route; and
   a controller that controls operations of the location sensor, the roadmap storage, the route calculator, and the display for the search and route guide through a navigation program,
   wherein the route calculator calculates the time link cost based on a time weight function using a straight line distance from the departure point to the destination as a variable and a link running required time in which a time that is taken when an actual vehicle passes through on each link basis is reflected.

* * * * *